United States Patent
Tatnell et al.

(10) Patent No.: US 12,442,032 B2
(45) Date of Patent: Oct. 14, 2025

(54) SOLID SUPPORT FOR SAMPLE COLLECTION

(71) Applicant: Global Life Sciences Solutions Operations UK Ltd, Sheffield (GB)

(72) Inventors: Peter James Tatnell, Cardiff (GB); Nina Moran, Bristol (GB)

(73) Assignee: Global Life Sciences Solutions Operations UK Ltd, Sheffield (GB)

( * ) Notice: Subject to any disclaimer, the term of this patent is extended or adjusted under 35 U.S.C. 154(b) by 169 days.

(21) Appl. No.: 17/237,518

(22) Filed: Apr. 22, 2021

(65) Prior Publication Data

US 2021/0238656 A1    Aug. 5, 2021

Related U.S. Application Data

(62) Division of application No. 16/078,787, filed as application No. PCT/EP2017/054636 on Feb. 28, 2017, now abandoned.

(30) Foreign Application Priority Data

Feb. 29, 2016 (GB) .................................. 1603459

(51) Int. Cl.
 *C12Q 1/68*   (2018.01)
 *C12Q 1/6806*  (2018.01)
 *G01N 1/02*   (2006.01)
 *G01N 1/10*   (2006.01)

(52) U.S. Cl.
 CPC ............. *C12Q 1/6806* (2013.01); *G01N 1/02* (2013.01); *G01N 1/10* (2013.01)

(58) Field of Classification Search
 CPC ..................................................... C12Q 1/68
 USPC ....................................................... 435/6.12
 See application file for complete search history.

(56) References Cited

U.S. PATENT DOCUMENTS

| | | | |
|---|---|---|---|
| 3,485,587 A | 12/1969 | Keston | |
| 6,316,248 B1 * | 11/2001 | Elliott | ............... C12N 15/1003 435/243 |
| 7,261,857 B2 * | 8/2007 | Suslick | .................. G01N 21/78 422/68.1 |
| 7,498,133 B2 | 3/2009 | Fomovskaia et al. | |

(Continued)

FOREIGN PATENT DOCUMENTS

| EP | 0734684 A1 | 10/1996 |
|---|---|---|
| EP | 2410063 A1 | 1/2012 |

(Continued)

OTHER PUBLICATIONS

Wikipedia, chaotropic agent, https://en.wikipedia.org/wiki/Chaotropic_agent, accessed May 30, 2023.*

(Continued)

*Primary Examiner* — Aaron A Priest
(74) *Attorney, Agent, or Firm* — Eversheds-Sutherland (US) LLP

(57) ABSTRACT

The present invention relates to means for collection of biological samples. Specifically, the present invention provides a solid support for collection, storage and subsequent analysis of a biological sample as well as methods for use of the solid support of the invention and a kit comprising the solid support of the invention.

7 Claims, 7 Drawing Sheets

(56) References Cited

U.S. PATENT DOCUMENTS

| | | | | |
|---|---|---|---|---|
| 7,563,621 | B2 * | 7/2009 | Profitt | G01N 33/54353 436/166 |
| 9,265,856 | B2 | 2/2016 | Song et al. | |
| 2006/0154234 | A1 * | 7/2006 | Winther | G01N 33/54346 435/6.14 |
| 2014/0370513 | A1 * | 12/2014 | Ogden | G01N 1/02 435/6.12 |
| 2016/0022853 | A1 * | 1/2016 | Hajime | A61B 50/30 206/370 |
| 2016/0187309 | A1 * | 6/2016 | Kang | B65B 55/10 436/39 |
| 2016/0327491 | A1 * | 11/2016 | Wood | F24F 13/28 |

FOREIGN PATENT DOCUMENTS

| | | | | |
|---|---|---|---|---|
| GB | 888039 | A | 1/1962 | |
| GB | 2084725 | A * | 4/1982 | G01N 31/224 |
| WO | WO-0014505 | A1 * | 3/2000 | B01L 3/505 |
| WO | WO-0015776 | A1 * | 3/2000 | C12N 15/1006 |
| WO | WO-0110471 | A1 * | 2/2001 | A61L 2/206 |

OTHER PUBLICATIONS

PCT International Search Report and Written Opinion for PCT Application No. PCT/EP2017/054636 mailed May 22, 2017 (9 pages).
GB Search Report for GB Application No. 11603459.7 mailed Nov. 28, 2016 (4 pages).
Stratagene (Gene Characteristics Kits), 1988.
Weiner et al., "Kits and Their Unique Role In Molecular Biology: A Brief Retrospective," BioTechniques, 2008, 44:701-704.
EP Office Action Application No. 282904-EP-3 mailed Apr. 12, 2021 (86 pages).
Haines et al., Effect of Nucleic Acid Binding Dyes on DNA Extraction, Amplication and STR Typing, dated Jul. 15, 2015, published in Electrophoresis 2015, 36, (pp. 2561-2568).

* cited by examiner

SOLID SUPPORT FOR SAMPLE COLLECTION

CROSS REFERENCE TO RELATED APPLICATIONS

This application is a divisional application of U.S. Ser. No. 16/078,787 filed on Aug. 22, 2018, which claims the priority benefit of PCT/EP2017/054636 filed on Feb. 28, 2017 which claims priority benefit of Great Britain Application No. 1603459.7 filed Feb. 29, 2016. The entire contents of which are hereby incorporated by reference herein.

TECHNICAL FIELD OF THE INVENTION

The present invention relates to means for collection of biological samples. Specifically, the present invention relates to a solid support particularly suitable for collection, storage and subsequent analysis of a biological sample. The present invention also relates to methods for use of the solid support of the invention.

DESCRIPTION OF RELATED ART

A challenge the forensic community faces is meeting regulatory standards requiring all forensic consumables to be certified as being DNA-free according to ISO 18385 (Requirements Forensic-Grade Products for Human Identification). A favoured method to achieve this is by ethylene oxide (EtO) treatment as described for example by Archer et al (2010 Forensic Sci Intl: Genetics; 4: 239-243) or by Shaw et al (2008 Int. J Legal Med; 122: 29-33). Ethylene oxide is an organic cyclic ether with the formula $C_2H_4O$. Cyclic ethers consist of an alkane with an oxygen atom bonded to two carbon atoms, forming a ring. The use of EtO is a widely accepted as a gas phase sterilization technique in the medical industry for the elimination of viable micro-organisms from medical devices and has recently been demonstrated to effectively minimize the presence of amplifiable DNA on items for forensic analysis. It has been shown that EtO treatment does not affect any downstream forensic DNA analysis such as short tandem repeat (STR) profiling. EtO facilitates the production of un-amplifiable DNA by cross-linking functional groups located in the DNA molecule to solid support surfaces thereby making them inaccessible to DNA polymerases used during PCR.

There are many occasions when it is desirable to collect DNA evidence from a crime scene, suspect or victim for human identification purposes. In these instances sample collection cards are commonly used. These traditionally consist of cellulose-based solid support papers which may or may not be coated or impregnated with chemicals that preserve or stabilise nucleic acid for prolong periods of time. Such chemicals can facilitate transportation and storage e.g. Whatman FTA and FTA Elute. The DNA is subsequently analysed and typically short tandem repeat STR profiles are generated for human identification. STR involves amplification of specific alleles at defined loci in the human genome for human identification purposes. It is associated with multiplex PCR and the resultant fluorescently labelled PCR products are separated by capillary electrophoresis (CE).

For human reference samples which are normally associated with the removal of buccal cells from a suspect, i.e. a colourless sample, the cellular material is transferred to paper solid supports that are coated or impregnated with an indicator dye. Any colour change associated with the dye is used to indicate the location of the sample on the solid support. Products such as Whatman Indicating FTA, Indicating FTA Elute and Indicating DMPK cards are commercially-available from GE Healthcare for the collection, transportation and long term storage of colourless biological samples including buccal cells, urine, spinal fluid etc.

The indicating dye currently used for the Whatman indicating FTA Elute is Chlorophenol Red (as described in US20140370513). This is classified as a pH dye that changes colour from purple to yellow/white on application of an aqueous biological sample. The dye also indicates sample location via a chromatographic method in which the sample physically moves the dye in a solvent front generating a paler white area that co-localises with the sample. The Indicating FTA and DMPK sample collection cards are also coated with indicating coloured dyes that change from pink to yellow/white and blue to white respectively on the application of a colourless sample.

However, it has been demonstrated that the current indicator dyes used with FTA indicating products fade on exposure to EtO and UV radiation.

Therefore there is a need for alternative indicators that exhibit: i) sufficient resistance to colour fading when exposed to EtO and UV, ii) stability to temperature and humidity, iii) ability to colour a solid support evenly generating a homogenous and constant colour intensity and iv) water soluble in order to be compatible with current manufacturing techniques. The indicator must not interfere or inhibit the biological sample on the solid support or any components or reagent used to subsequently analyse the sample e.g. DNA polymerases, fluorescently-labelled primers, capillary electrophoresis used for detection, etc. All of these features are vital to successfully collect and process biological samples, e.g. in a forensic sample analysis workflow such as generating STR profiles etc. Any interference will potentially affect the quality and integrity of the analysis and thereby compromise the identification process.

SUMMARY OF THE INVENTION

In a first aspect the present invention provides a solid support for collecting a biological sample wherein said solid support comprises a dye selected from the group comprising:
  (a) Alizarin Red
  (b) Methylene blue
  (c) Reactive blue 4
  (d) Alcian blue
  (e) Indigo carmine
  (f) Bromophenol blue In a second aspect the present invention provides a method for collecting a biological sample wherein said method comprises applying said biological sample to a solid support as defined herein.

In a third aspect the present invention provides a method for biological profiling wherein said method comprises the method for collecting a biological sample as defined herein followed by assaying for cellular matter comprised in said biological sample.

A fourth aspect of the present invention is use of the solid support of the first aspect of the invention in the collection of a biological sample.

In a fifth aspect the present invention provides a kit for collection of a biological sample wherein said kit comprises the solid support as defined herein and instructions for carrying out one or more of the methods as defined herein.

The solid support of the present invention which comprises a dye exhibits resistance to colour fading when exposed to EtO and UV, is stable to temperature and humidity, has a homogenous and constant colour intensity, is water soluble and therefore compatible with current manufacturing techniques and does not interfere or inhibit a biological sample collected thereupon or any components or reagent used to subsequently analyse the sample e.g. DNA polymerases, fluorescently-labelled primers, capillary electrophoresis used for detection etc. The functioning all of these components is vital for the success e.g. of forensic sample analysis workflow such as generating STR profiles. Lack of interference means that the quality and integrity of the profile and thereby the human identification process is not compromised.

DETAILED DESCRIPTION OF THE PREFERRED EMBODIMENTS

Figure 1A:
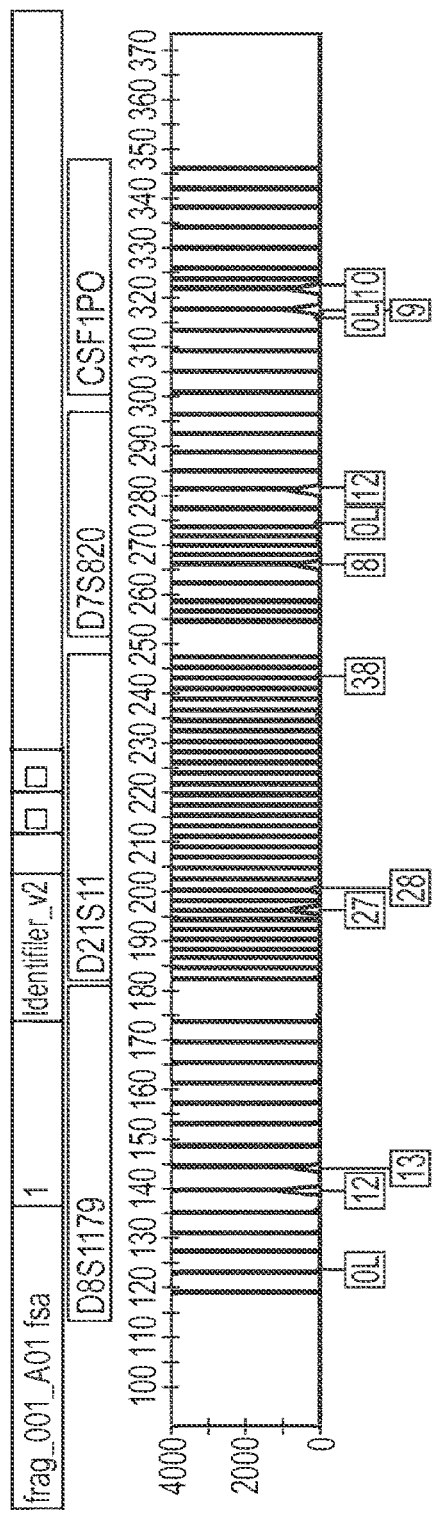
FIGS. 1a-d is a representative short tandem repeat (STR) profile generated showing concordance of dyed papers with the controls in terms of allele designation as described in the associated electrophoretograms.
Figure 1B:
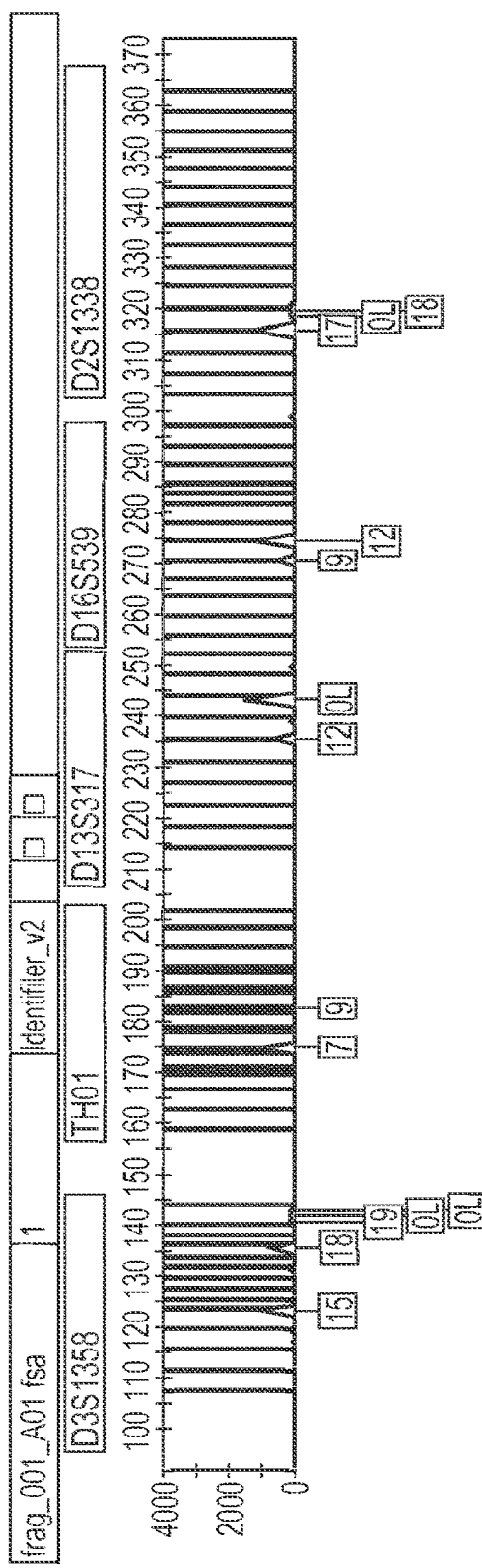
Figure 1C:
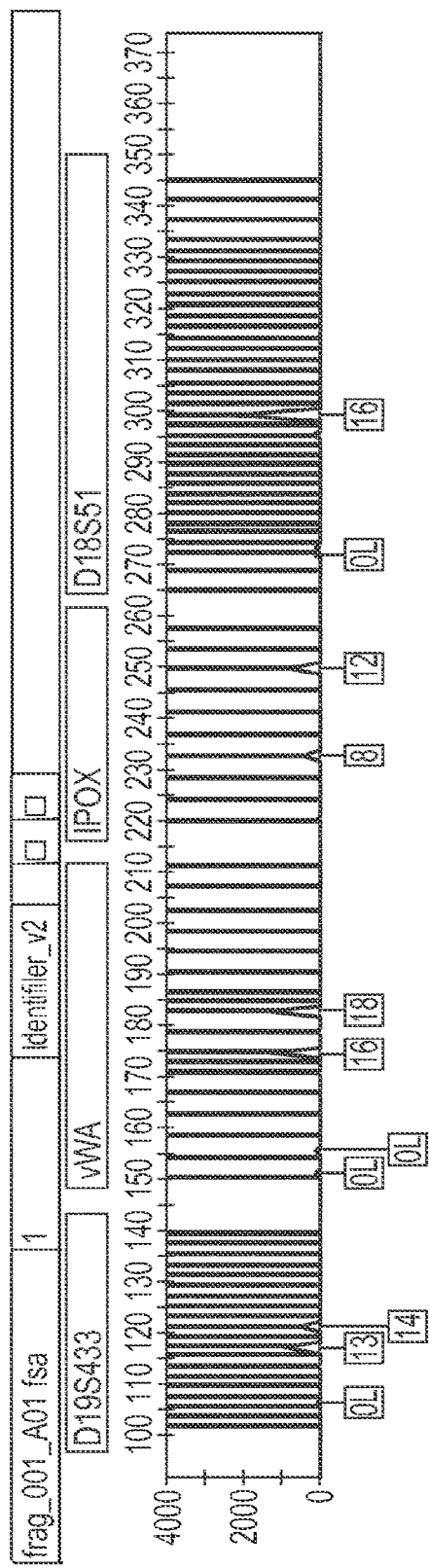
Figure 1D:
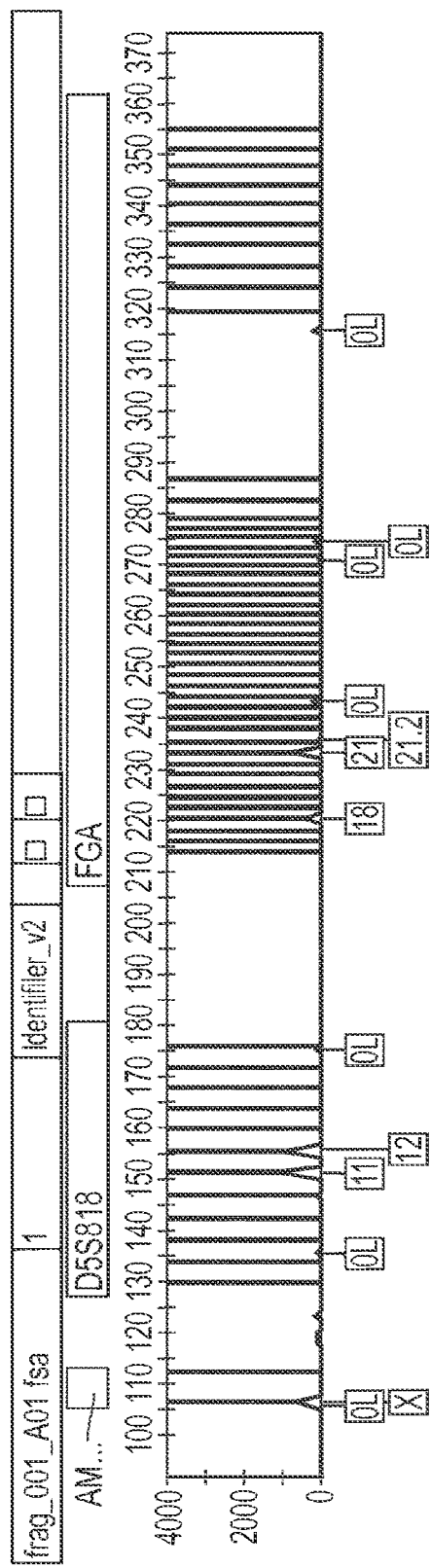

To more clearly and concisely describe and point out the subject matter of the claimed invention, definitions are provided hereinbelow for specific terms used throughout the present specification and claims. Any exemplification of specific terms herein should be considered as a non-limiting example.

The terms "comprising" or "comprises" have their conventional meaning throughout this application and imply that the agent or composition must have the essential features or components listed, but that others may be present in addition. The term 'comprising' includes as a preferred subset "consisting essentially of" which means that the composition has the components listed without other features or components being present.

The term "solid support" can in certain embodiments be understood to comprise a glass- or silica-based solid phase medium, a plastics-based solid phase medium, porous ceramics or a fibrous material. In one embodiment said glass-based solid phase medium is selected from glass, glass fibre and glass microfiber. In one embodiment said silica-based solid medium is selected from silica, silica gel and silica oxide. In one embodiment said fibrous material is selected from cellulose, nitrocellulose, wool and carboxymethylcellulose. In one embodiment said plastics-based solid medium is selected from polyester, polyamide, carbohydrate polymers, polypropylene, polytetrafluororethylene and polyvinylidinefluoride. In one embodiment said solid support comprises a fibrous material selected from cellulose fibres; or alginates; or fibrous polymeric materials.

In one embodiment said solid support is selected from the group comprising cellulose based paper, woven or non-woven fibrous materials, including man made, or naturally occurring polymer fibres such as an alginate, mineral fibre based materials such as glass fibre materials.

In one embodiment said solid support is a cellulose based paper.

The term "collecting" refers to the act of transferring a biological sample from an individual or from a location onto said solid support of the invention.

The term "biological sample" as used herein refers to a sample comprising cellular matter from a biological organism.

In one embodiment said cellular matter comprises nucleic acid.

In one embodiment said nucleic acid comprises DNA or RNA.

In one embodiment said cellular matter comprises protein.

In one embodiment said cellular matter comprises carbohydrate.

In one embodiment said biological sample is colourless.

In one embodiment said biological sample is a bodily fluid.

In one embodiment said bodily fluid is a mammalian bodily fluid.

In one embodiment said bodily fluid is a human bodily fluid.

In one embodiment said bodily fluid comprises buccal cells, saliva, vaginal swabs, semen, lymph, interstitial fluid, plasma, serum, cerebral spinal fluids, cervical swabs or urine.

Where the biological sample comprises nucleic acid it is typically used to identify one or more individuals using genotyping. The term "genotyping" as used herein is the investigation of the genetic constitution of an individual human or organism. The biological sample may be a forensic sample collected in connection with a crime. For this embodiment it is envisaged that the sample may be collected at a crime scene or from an alleged victim or an alleged perpetrator of a crime. Sample collection may alternatively be carried out at the scene of a disaster. A "disaster" in the context of the present invention can be understood to be a calamitous event, typically occurring suddenly and causing injury or loss of life. The cause of a disaster can be naturally-occurring, e.g. earthquakes, landslides, volcanic eruptions, floods, hurricanes, tornadoes, blizzards, tsunamis, and cyclones; or can be due to human activity, e.g. stampedes, fires, transport accidents, industrial accidents, oil spills, nuclear explosions/radiation, war and other deliberate attacks. In one embodiment the scene of a disaster is a scene of mass destruction, i.e. resulting in injury and/or death on a large scale.

In addition to the foregoing description, it will be noted that the skilled person is familiar with a range of different biological sample types and methods for their collection. Reviews by van Oorchot et al (2010 Investigative Genetics; 1: 14), Budowle and van Daal (2009 BioTechniques; 46: 339-350) and Romeika and Yan (2013 J Forensic Res; S12: 001) provide additional detail in connection with current knowledge relating to collecting and handling forensic trace DNA.

In one embodiment said biological sample is an environmental sample collected for the purpose of environmental monitoring. The term "environmental monitoring" describes the processes and activities that need to take place to characterise and monitor the quality of the environment. For this embodiment the cellular matter of interest is typically microbiological, e.g. pathogens or indicator species such as *Escherichia coli*.

In one embodiment said environmental sample is a water sample. For example the sample may be taken from a natural body of water such as a river or lake in order to determine the presence or quantity of a particular organism or organisms, or of particular cellular matter.

In one embodiment said environmental sample is a dry sample in a solution. For example this might be a sediment or soil suspended or dissolved in an appropriate solution.

In one embodiment said biological sample comprises a synthetic biological molecule. In one embodiment said synthetic biological molecule is an oligonucleotide primer.

The phrase "comprises a dye" means any configuration whereby the dye is associated with the solid support, e.g. including where the solid support is coated with said dye, where the dye is embedded within said solid support, etc.

In one embodiment said solid support is chemically impregnated with said dye.

In one embodiment said solid support is coated with said dye.

In one embodiment said dye is covalently attached to said solid support.

The dyes of the present invention performed well in all the tests described in the examples. The following summarises the findings:

Alizarin Red S—The intensity and distribution of colour achieved by this dye was irrespective of the paper type i.e. chemically coated/impregnated or un-coated. However, the pH of the solution used and the concentration of the dye do appear to have an effect on the colour intensity. Minimal optimisation was performed and the best colour change on application of a biological sample was achieved using the 3.9 mM in Tris HCl solutions (colour change from pink/lilac to pale yellow when applied to uncoated papers and from pink to pale yellow or orange/pink depending on the chemicals used to initially coat the papers). Irrespective of the colours generated on application of the sample Alizarin Red S clearly functions well as an indicating dye. Biological samples applied to Alizarin Red S dyed papers successfully produced STR profiles. When using the dye >3.9 mM some PCR inhibition and dye artefacts in EPG were present. However, at lower concentrations i.e. 1.95 and 0.98 mM these issues were not observed.

Methylene Blue—Although some loss of colour intensity was seen after UV irradiation, however, methylene blue still out-performed the dye currently used as an indicator on commercially-available sample collection cards. An even colour intensity was achieved with 0.96 mM Methylene Blue. When a biological sample was applied the colour changed chromatographically (blue to light blue/white) giving a clear indication of the sample location. Methylene Blue is classed as a biological indicator (used as a stain for nuclei). However, the dye did not exhibit darker areas within the sample that could correlate with cell nuclei. Methylene Blue did not show any significant inhibition in quantitative or multiplex PCR reactions. Samples were successfully analysed using standard STR analysis protocols giving full, concordant profiles.

Reactive Blue 4—A minor loss of colour was observed during the UV studies but it still outperformed Chlorophenol Red. At a concentration of 3.14-0.31 mM an even intensity sky blue colour was achieved on all paper types. Reactive Blue was able to function as a sample indicator dye. Minor levels of inhibition was observed during quantitative and multiplex PCR reactions. Standard STR analysis methods gave good, full concordant profiles.

After UV exposure there was no observable fading/loss of colour intensity for Alcian Blue 8GX. At a concentration of 2.31-0.23 mM an even blue colouration was achieved irrespective of paper type used. At lower concentrations the dyed papers were still able to indicate sample location by a colour change from blue to a paler blue/white. Alcian Blue was classed as a biological dye but functioned through chromatography, and did not appear to show areas of higher sample concentration. Alcian Blue 8GX did not inhibit quantitative or multiplex PCR reactions significantly. STR profiling was performed with encouraging results albeit with some indication of a decreased efficiency in the amplification of high molecular weight products, which can be addressed by optimising the concentration.

Only a very slight loss of colour intensity was observed during UV exposure for Indigo Carmine but the dye still outperformed Chlorophenol Red. An even blue colour distribution was produced on all three paper types (i.e. Whatman 903 uncoated, FTA and FTA Elute) at a concentration of 7.29-0.73 mM. The application of a sample caused a colour change to a light blue/white although this was not as easy to observe compared to other dyes. It is believed that optimisation will improve performance. The dye did not inhibit quantitative or multiplex PCR reactions. Full STR analysis of applied samples using standard protocols resulted in concordant profiles.

The pH dye Bromophenol Blue was shown to be relatively resistant to EtO treatment, good at sample indication and shown to cause little inhibition to quantitative and multiplex PCR reactions. However, UV stability was only equivalent to Chlorophenol Red.

In one embodiment of the invention Methylene Blue concentration is in the range 0.3-4.0 mM.

In one embodiment of the invention Methylene Blue concentration is in the range 0.3-2.0 mM.

In one embodiment of the invention Alizarin Red S concentration is in the range 0.3-10.0 mM.

In one embodiment of the invention Alizarin Red S concentration is in the range 0.9-3.0 mM.

In one embodiment of the invention Alcian Blue concentration is in the range 5-0.1 mM. In one embodiment of the invention Alcian Blue concentration is in the range 2.30-0.23 mM.

In one embodiment of the invention Indigo Carmine concentration is in the range 7.5-0.2 mM.

In one embodiment of the invention Indigo Carmine concentration is in the range 3-0.5 mM.

In one embodiment of the first aspect of the present invention said dye is selected from Alizarin Red, Alcian blue and Indigo Carmine.

In one embodiment said solid support comprises more than one dye from the group as defined herein. A combination of dyes may act to facilitate the visual detection of the location of the biological sample by enhancing the tone and/or colour differences between areas where the biological sample is present and areas where it is absent.

In one embodiment said more than one dye is selected from Alizarin Red and Alcian blue; or Alizarin Red and Indigo Carmine; or Alcian blue and Indigo Carmine.

In one embodiment said solid support further comprises one or more nucleic acid stabilisation chemicals. The solid support in this embodiment is by definition particularly suited to wherein the cellular matter of interest comprises a nucleic acid. The nucleic acid stabilisation chemicals act to protect nucleic acids from damage due to chemical and environmental factors.

Furthermore, these chemicals act to maintain stability of the nucleic acid so that it can be stored for future analysis.

In one embodiment said solid support is impregnated with said nucleic acid stabilisation chemicals.

In one embodiment said solid support is coated with said nucleic acid stabilisation chemicals.

In one embodiment said nucleic acid stabilisation chemicals are covalently attached to said solid support.

In one embodiment said nucleic acid stabilisation chemicals comprise a weak base, a chelating agent, an anionic surfactant and an anti-oxidant.

In one embodiment said weak base is Tris HCl.

In one embodiment said chelating agent is EDTA.

In one embodiment said an anionic surfactant is SDS.

In one embodiment said anti-oxidant is uric acid.

In one embodiment said nucleic acid stabilisation chemicals are Tris HCl, EDTA, SDS and uric acid.

A commercially-available example of a solid support wherein said nucleic acid stabilisation chemicals are Tris HCl, EDTA, SDS and uric acid is the Whatman FTA card available from GE Healthcare.

In one embodiment said one or more nucleic acid stabilisation chemicals comprises a chaotrope.

In one embodiment said chaotrope is a guanidinium salt.

In one embodiment said chaotrope is guanidine hydrochloride.

A commercially-available example of a solid support wherein said nucleic acid stabilisation chemical is guanidine hydrochloride is the Whatman FTA Elute card available from GE Healthcare.

In one embodiment said solid support has been treated with EtO. Methods of treatment with EtO are well-known to those of skill in the art. Non-limiting examples are described by Archer et al. (2010 Forensic Sci Intl: Genetics; 4: 239-243) and Shaw et al. (2008 Int J Legal Med; 122: 29-33) and in US20070148035.

The dyes perform as biological sample indicators on the solid supports but also exhibit colour stability to EtO and UV light exposure, elevated thermal and humidity while at the same time not interfering with the detection of cellular matter of interest generated from downstream analytical procedures as defined hereinbelow for methods of the invention. In addition the dyes do not affect the long term stability of the stored cellular material. Furthermore, the dyes do not chemically react or interfere with the functioning of any nucleic acid stabilisation chemicals present on the FTA product family.

In the method for biological profiling of the third aspect of the present invention, the term "biological profiling" refers generally to methods where the aim is to identify a particular individual, a particular organism or the presence and/or amount of some defined cellular matter.

The term "assaying" is used herein to encompass any method that can be used to determine the presence, identity and/or amount of particular cellular matter where the term cellular matter is as defined herein in connection with the first aspect of the invention.

In one embodiment where said cellular matter comprises a nucleic acid, said assaying comprises a polymerase chain reaction (PCR).

In one embodiment said PCR is multiplex PCR.

In one embodiment said multiplex PCR is STR profiling.

In one embodiment of the method of the invention more than one nucleic acid sequence is detected simultaneously.

In one embodiment of the method of the invention wherein said cellular matter comprises a nucleic acid, said assaying comprises quantitative amplification.

In one embodiment where said cellular matter comprises a protein, e.g. an enzyme, said assaying comprises an enzyme assay or an enzyme-linked immunosorbent assay (ELISA).

In one embodiment where said cellular matter comprises a carbohydrate, said assaying comprises chromatography or a simple chemical assay. Assays such as these are well-known to those of skill in the art, as for example described by Dubois et al. (1956 Anal Chem; 28: 350-356) and Blumenkrantz & Asboe-Hansen (1973 Anal Biochem; 54: 484-489).

In one embodiment said chromatography is thin layer chromatography (TLC), gas chromatography (GC) or high performance liquid chromatography (HPLC).

In one embodiment of the method of biological profiling of the invention said analyte is present on said solid support during said assaying step.

In one embodiment said solid support is washed to remove any contaminating material prior to said assaying. The term "contaminating material" refers in particular to any chemicals associated with the solid support such as the nucleic acid stabilisation chemicals discussed hereinabove which may interfere with the assaying step.

The solid support of the present invention may be conveniently provided in a kit form along with instructions and reagents for carrying out a method of the present invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties, as if they were individually incorporated.

BRIEF DESCRIPTION OF THE EXAMPLES

Example 1 describes paper dyeing tests.

Example 2 describes how sample of dyed solid supports were prepared.

Example 3 describes ethylene oxide treatment of dyed solid supports of the invention.

Example 4 describes how dyed solid supports of the invention reacted to UV radiation.

Example 5 describes how dyed solid supports of the invention reacted to elevated temperature & humidity.

Example 6 describes sample indicating tests.

Example 7 examines inhibition in quantitative and multiplex PCR reactions.

Example 8 describes STR analysis of biological samples.

LIST OF ABBREVIATIONS USED IN THE EXAMPLES

DNA deoxyribonucleic acid
EtO ethylene oxide
PBS phosphate-buffered saline
PCR polymerase chain reaction
qPCR quantitative polymerase chain reaction
TE tris EDTA
UV ultraviolet

EXAMPLES

Example 1: Paper Dyeing Test

Aqueous-based solutions were made up of each of the dyes listed in the table below:

| No | Dye Name | Dye Type | Other Properties |
|---|---|---|---|
| 01 | Alizarin Red S | pH dye | pH 3.7 (yellow) pH 5.2 (purple), anionic anthraquinone dye |
| 02 | Bromocresol Purple | pH dye | pH 5.2 (yellow) pH 6.8 (purple), sulfonephthalein indicator |
| 03 | Bromophenol Blue | pH dye | pH 3.0 (yellow)-pH 4.6 (blue), sulfonephthalein indicator |
| 04 | Bromophenol Red | pH dye | pH 5.2 (orange/yellow)-pH 6.8 (purple) |
| 05 | Bromothymol Blue | pH dye | pH 6.0 (yellow)-pH 7.6 (blue), sulfonephthalein indicator |
| 06 | Bromoxylenol Blue | pH dye | pH 6.0 (yellow)-pH 7.6 (blue), sulfonephthalein indicator |
| 07 | Chlorophenol Red | pH dye | pH 4.8 (yellow)-pH 6.4 (red), sulfonephthalein indicator |
| 08 | m-Cresol Purple | pH dye | pH 1.2-2.8 (red-yellow) and pH 7.4-9.0 (yellow-purple), |
| 09 | Cresol Red | pH dye | pH 0.2-1.8 (orange-yellow) and pH7.2-8.8 (yellow-red/purple) |
| 10 | Litmus Soln | pH dye | Broad interval pH 4.8 (red)-pH 8.3 (blue), natural dye |
| 11 | Methyl red | pH dye | pH 4.2 (pink)-pH 6.2 (yellow), monoazo dye |
| 12 | Neutral Red | biological pH dye | pH 6.8 (red)-pH 8.0 (yellow), cationic azine dye |
| 13 | Nile Blue | pH, biological dye | pH 10.1 (blue)-pH 11.1 (red), cationic oxazine dye, stains nuclei blue, used as a lipid dye |
| 14 | Nitrazine Yellow | pH dye | pH 6.0 (bright yellow)-pH 7.2 (bright blue), anionic dye |
| 15 | Rosolic Acid | pH dye | pH 6.6 (yellow)-pH 8.0 (red) |
| 16 | Brilliant Blue E133 | Food colouring | |
| 17 | Fast Green FCF E143 | Food colouring | |
| 18 | Allura Red AC E129 | Food colouring | |
| 19 | Acid Red 1 | General dye | Anionic monoazo dye, used to dye fabric, paper, plastics etc, |
| 20 | Erioglaucine | Food colouring | Used to dye wool, silk, nylon, and paper, |
| 21 | Ponceau S Solution | Biological stain | Used as a protein stain, anionic diazo dye |
| 22 | Tartrazine | Synthetic food dye | Monoazo dye, used to dye foods, paper, wool contrast stain |
| 23 | Direct Blue 71 | Direct dye | Anionic triazo dye, used to dye cellulose, wool, paper etc. |
| 24 | Direct Red 23 | Direct dye | Anionic disazo dye, used to dye cotton, silk, paper etc. |
| 25 | Direct Violet 51 | Direct dye | Anionic disazo dye, used to dye cotton, silk, paper etc. |
| 26 | Acid Red 4 | General dye | Anionic dye, used to wool, nylon, paper etc. |
| 27 | Alcian Blue 8GX | Biological dye | Cationic dye, stain for polysaccharides, binds to negatively charged macromolecules, stains nuclei black. |
| 28 | Brilliant Blue G | Biological dye | Used to dye wool, silk, and paper, binds to proteins |
| 29 | Bromocresol Green | pH dye | pH 3.8 (yellow)-pH 5.4 (blue-green), sulfonephthalein |
| 30 | Chlorazol Fast Pink | Direct dye | Anionic disazo dye, dyes cotton, silk, beater paper etc., |
| 31 | Coomassie Brilliant Blue R | Biological dye | Used to dye wool, silk and paper, binds to proteins |
| 32 | Crocein Orange G | General dye | Anionic monoazo dye, used to dye wool, silk, paper etc. |
| 33 | Fast Violet B | Textile dye | Used to dye cotton |
| 34 | Indigo Carmine | pH dye | pH 11.5 (blue)-pH 14.0 (yellow) |
| 35 | Indocyanine Green | Biological dye | Binds to plasma proteins, fluorescent dye |
| 36 | Methylene Blue | Biological stain | Can be used as a nuclear stain, antiseptic properties, |
| 37 | Mordant Blue 9 | General dye | Monoazo dye, used to stain wool, silk etc. |
| 38 | Oil Red O | Biological dye | Used as stain for lipids and fats |
| 39 | Orange G | pH dye | pH 11.5 (yellow)-pH 14.0 (pink), used to dye textiles, paper etc., |
| 40 | Phthalocyanine Cu | Dye | Macrocyclic compound, used to dye textiles, papers etc. |
| 41 | Phthalocyanine Green | Dye | Macrocyclic compound, used to dye textiles, papers etc., |

-continued

| No | Dye Name | Dye Type | Other Properties |
|---|---|---|---|
| 42 | Phthalocyanine Fe | Dye | Macrocyclic compound, used to dye textiles, apers etc. |
| 43 | Phthalocyanine Mg | Dye | Macrocyclic compound, used to dye textiles, apers etc. |
| 44 | Phthalocyanine Zn | Dye | Macrocyclic compound, used to dye textiles, papers etc. |
| 45 | Prussian Blue | Inorganic dye | Inorganic pigment, used to colour paints, textiles, paper |
| 46 | Reactive Blue 4 | Dye | Anthraquinone used to dye textiles |
| 47 | Rhodamine B | Fluorescent dye | Used to dye wool and cotton, biological stain for blood |
| 48 | Rhodamine 6G | Fluorescent dye | Used to dye paper, used as a laser dye |
| 49 | Ruthenium Red | Biological dye | Can be used as a biological stain for polysaccharides |

Each dye was applied to several cellulose-based papers, i.e. Whatman 903, Whatman FTA and FTA Elute. The solutions for the pH indicating dyes were adjusted depending upon the existing chemical coating so that when applied the correct pH levels were present thereby ensuring that the correct dye colour was maintained. Each solution was placed in a petri dish and small pieces of each paper were dipped into the solution using a pair of forceps for a few seconds, ensuring an even coating. The dyed papers were then allowed to dry at ambient temperature overnight.

Several candidate dyes were ruled out based on poor solubility, poor colour after drying and/or issues with drying including: Nile Blue (13), Brilliant Blue E133 (16), Fast Green E143 (17), Fast Violet B (33), indocyanine Green (35), Oil Red O (38), Phthalocyanine Cu (40), Phthalocyanine Green (41), Phthalocyanine Fe (42), Phthalocyanine Mg (43), Phthalocyanine Zn (44) and Prussian Blue (45).

Example 2: Sample Preparation

Paper sheets coated with the remaining candidate dyes were generated and subjected to different conditions to assess their stability to; a) ethylene oxide (EtO), b) ultra violet (UV) and c) a combination of elevated temperature and humidity.

Cellulose-based paper sheets were cut up into 4×6 cm pieces. Aqueous solutions of each dye were prepared as described earlier. Appropriate volumes of the dye solutions were dispensed in petri dishes and the cut papers were placed for a few seconds in the solution using forceps. The dyed papers were subsequently allowed to dry overnight on aluminium foil at ambient temperature. A protective sheet of aluminium foil was place on top to protect the dyed papers from potential contamination, light etc. Names/numbers were added to facilitate identification. After drying, the dyed papers were attached to larger A4 pieces of card producing sample sheets. Multiple sample sheets were generated for each paper type. Controls sheets were also generated and these were stored in envelopes at ambient temperature covered with protective aluminium foil.

Example 3: Ethylene Oxide Treatment

Chemically coated/impregnated and uncoated papers as obtained in Example 2 were sent to Synergy Health Sterilisation UK Ltd for exposure to EtO. EtO Cycle conditions were based upon those described by Archer et al. (2010 Forensic Sci Intl: Genetics; 4: 239-243) and Shaw et al. (2008 Int J Legal Med; 122: 29-33). The actual EtO cycling conditions used were: Cycle 1, pre-conditioning at 42.0-45.0° C., for 12 h at a relative humidity 64.5-72.8%. EtO sterilisation was carried out at 43.7-46.5° C. for 4 h at 480 mbar. Removal of EtO was achieved by de-gassing at 42.2-46.2° C. for 12 h. Cycle 2; pre-conditioning at 43.6-47.7° C. for 12 h, at a relative humidity of 64.7-72.8%. EtO sterilisation; 44.1-46.7° C. for 4 h at 480 mbar. De-gassing was performed at 43.0-46.2° C. for 12 h. The colour of samples exposed to EtO were compared to the control samples to determine if any colour changes and/or fading had occurred.

Dye samples that showed little or no colour change and therefore displayed good stability/resistance to EtO treatment were Alizarin Red S, Bromocresol Purple, Bromophenol Blue, Litmus Soln, Methyl Red, Brilliant Blue E133, Fast Green FCF E143, Allura Red AC E129, Acid Red 1, Erioglaucine, Ponceau S Soln, Tartrazine, Direct Blue 71, Direct Red 23, Direct Violet 51, Acid Red 4, Alcian Blue 8GX, Brilliant Blue G, Bromocresol Green, Chlorazol Fast Pink, Coomassie Brilliant Blue R, Crocein Orange, Indigo Carmine, Indocyanine Green, Methylene Blue, Orange G, Reactive Blue 4, Rhodamine B and Rhodamine 6G.

Example 4: Exposure to UV Radiation

Dyed papers as prepared in Example 2 were exposed to ultra violet (UV) radiation using a UVA 340 fluorescent bulb, under dry conditions at 50° C. for 250 and 500 h. These conditions are equivalent to approximately 6-12 months of outdoor exposure (acceleration factor of x 10–x 20). After exposure the dyed samples were compared with control samples to determine if any fading and/or colour changes had occurred.

Chlorophenol Red which is used as a sample indicating dye on collection papers was included in these experiments and could therefore be used as a comparison against the other dyes to assess their performance given that Chlorophenol Red is known to exhibit only minor amounts of fading when exposure to the natural environment.

Surprisingly, under the UV conditions employed during this study, Chlorophenol Red faded significantly. Complete bleaching was observed on both chemically coated and uncoated papers suggesting that dyes that fade less than Chlorophenol Red during UV exposure probably exhibits significantly better UV stability when exposed to the natural environment and therefore potentially represent better candidates for use as indicating dyes on sample collection cards.

Dyes that demonstrated excellent stability to UV exposure when applied to chemically-coated and uncoated sample collection papers were: Alizarin Red S (exhibited some minor fading associated with uncoated samples but no visible colour change when applied to chemically-coated papers), Alcian Blue 8GX (showed no major loss in colour intensity just a slight change in colour) Allura Red AC E129, Indigo Carmine and Reactive Blue 4 (exhibited only slight fading). All of these candidate dyes performed significantly better than Chlorophenol Red when exposed to EtO and UV radiation.

Additional Dyes when applied to both chemically-coated and uncoated cellulose papers that demonstrated good colour stability to EtO treatment and only a minor amount of fading when exposed to UV were: Acid Red 1, Tartrazine, Direct Blue 71, Direct Red 23, Direct Violet 51, Acid Red 4, and Chlorazol Fast Pink. The dye Methylene Blue demonstrated only a small amount of fading when applied to chemically coated papers and a slight change to greenish blue when applied to uncoated papers.

The following dyes when applied to chemically coated and uncoated cellulose papers demonstrated some degree of fading after 500 h exposure to ultra violet radiation but the extent of fading was considered to be significantly less than that observed for Chlorophenol red: Erioglaucine, Ponceau S, Crocein Orange and Orange G. After 500 h all the dyed papers irrespective of the presence of chemically coatings still possessed enough colouration for the above dyes to still exhibit a level of sample indicating properties.

These results indicate that several of the dyes tested possess greater UV stability as determined by reduced fading than indicating dyes currently used with commercially-available sample collection cards. The commercially-available indicating FTA sample collection cards are coated with the free-radical scavenger uric acid. Uric acid has been shown to protect DNA from the effects of UV exposure. Therefore enhanced UV stability may be accomplished if these alternative dyes are used in combination with uric acid or similar free-radical scavengers.

Example 5: Exposure to Elevated Temperature & Humidity

To assess if any dye fading or change in colours occurs due to temperature or humidity, samples prepared according to Example 2 were placed in stability chambers at either 25° C. with relative humidity of 60% (real time; "THRT") or 40° C. with relative humidity of 75% (accelerated conditions; "THAC") for 4 weeks. After this period images were taken and compared to controls stored at ambient temperature and humidity.

After exposure to THRT and THAC conditions none of the dyes demonstrated any significant fading or loss of colour intensity. This pattern was observed for both chemically-coated and uncoated dyed papers. The only exception to this was Ruthenium Red (49) which exhibited fading and loss of colour intensity when applied to both chemically-coated and uncoated papers.

Example 6: Sample Indicating Tests

Cultured HeLa cells were applied to foam swab applicators and transferred to the dyed papers as prepared in Example 2. This experiment was designed to represent the collection of buccal from suspects during forensic human identification procedures. The HeLa cell swab samples were used to test the ability of each of the candidate dye to indicate the location of biological samples.

A 10 µl volume of Hela cells in PBS buffer (concentration ~8×105 cells per ml) was pipetted on to a sterile foam applicator and applied to the dyed paper using mild pressure for ~10 s. The samples were allowed to dry overnight at ambient temperature. Images were taken directly after application of the cells and again after drying. Hela cells were applied to chemically coated and uncoated papers, dyed with each of the candidate dyes described in Example 1. Commercially-available indicating cards were used as controls these included Whatman indicating FTA, Indicating FTA Elute and indicating DMPK-A, B and C.

Dyes that did not demonstrate a sufficiently good colour compatible with functioning as an indicating dye were Neutral Red, Brilliant Blue E133, Fast Green FCF E143, Allura Red AC E129, Tartrazine, Acid Red 4, Chlorazol Fast Pink and Indocyanine Green. Several of these dyes on sample application exhibited a dark outer area but on drying this disappeared and the sample location was not easily visible. For the remaining dyed papers the sample area was visible (to varying degrees) which confirmed their potential use as an indicating dye.

Several of the dyed cards that had bleached or faded following UV treatment exhibited a colour change back to the original colour on application of the sample. For example m-Cresol Purple (data not shown), which had bleached from dark blue/purple to white on UV treatment, exhibited the dark blue/purple colour on sample application. This was apparent for both chemically-coated and uncoated papers. Therefore even though these dyes did not show significant stability to UV irradiation does not necessarily mean that they should be discarded as they may still be able to indicate the location of biological samples.

Several of the dyes that were considered to show promise as sample indicators and had demonstrated enhanced stability after testing against EtO exposure and UV irradiation dyes were subjected to repeat analysis as sample indicators but using reduced dye concentrations in water and Tris/HCl buffers. These included; Alizarin Red S, Bromophenol Blue, Ponceau S, Direct Red 23, Direct Violet 51, Alcian Blue 8GX, Brilliant Blue G, Coomassie Brilliant Blue R, Crocein Orange, Indigo Carmine, Methylene Blue, Orange G, Reactive Blue 4, Rhodamine B and Rhodamine 6G.

Reduced concentrations did show an improvement in the indicating properties of some dyes e.g. Alizarin Red S, Bromophenol Blue, Alcian Blue 8GX, Indigo Carmine, Methylene Blue, Reactive Blue 4, Rhodamine B and Rhodamine 6G.

Tests using the Alizarin Red S dye showed the potential to get a good colour change if the resulting pH on the dyed paper is optimised. Solutions of varying concentrations (0.02 M, 3.90 mM, 1.95 mM and 0.98 mM) were made up in Tris HCl buffer solution, pH 8.0 and in Trizma Base solution, pH 10 to see if this would improve the indicating abilities. The best colours of the dye on paper were produced using the Tris HCl buffer and the best sample indication was provided by the 3.90 mM solution. The sample area was clearly visible after drying on all three paper types with a colour change from purple/pink to pale yellow.

From these tests the dyes that were shown to be good at indicating the sample were, for all paper types, Alizarin Red S 3.90 mM in Tris HCl Buffer, Bromophenol Blue 1.00 mM in water, Rhodamine B 0.59 mM in Tris HCl Buffer and Rhodamine 6G 0.71 mM in Tris HCl. For chemically coated papers; Alcian Blue 0.23 mM in water and Methylene Blue 0.96 mM in Tris HCl Buffer.

Example 7: Inhibition in Quantitative and Multiplex PCR Reactions

To test the possibility of candidate dyes exhibiting any possible interference or inhibitory effects on nucleic acid PCR amplification reactions, dye solutions and dyed papers were used to "spike" quantitative PCR and multiplex PCR reactions. The most promising dyes were selected based upon past performance in previous tests, and dye solutions were made up in either water or 0.1 M Tris HCl buffer solution pH 8.0 according to the following concentrations; 0.02 M-0.98 mM mM Alizarin Red S, 1.0 mM Bromophenol Blue, 4.68 mM Chlorophenol Red, 3.28 mM Erioglaucine, 0.23 mM Alcian Blue 8GX, 0.53 mM Brilliant Blue G, 0.56 mM Coomassie Brilliant Blue R, 0.73 mM Indigo Carmine, 0.96 mM Methylene Blue, 0.31 mM Reactive Blue 4, 0.59 mM Rhodamine B and 0.71 mM Rhodamine 6G.

Chemically uncoated papers were cut into 4×6 cm pieces. These were dyed and allowed to dry overnight at ambient temperature. In an additional experiment ×10 dilution of the above solutions were added directly to the PCR reactions described below.

Quantitative PCR was performed using the Quantifiler Human DNA Quantification Kit (ABI). Reactions were set-up in 96-well plates as per manufacturer's instructions. Control template DNA was prepared using the Quantifiler™ Human DNA standard with dilution in water to a concentration of 2 ng/µl. Control DNA (2 µl) was pipetted into each sample reaction well (excluding Quantifiler™ Standards and No Template Control wells). Punches (1.2 mm) were taken from the dyed papers and controls, and placed in the relevant reaction wells. Solution (1 al) of each dye was also placed in the relevant reaction wells of a different plate. Reactions were performed in triplicate. Quantitative PCR was performed using a 7900HT Fast Real-Time PCR System (ABI).

Quantitative PCR results are set out in the tables below:

|  | IPC | | Sample Ct | | Quantity (ng/µl) | |
| --- | --- | --- | --- | --- | --- | --- |
|  | Mean | sd | Mean | sd | Mean | sd |
| Liquid dye solution addition | | | | | | |
| Positive control | 27.53 | 0.08 | 28.51 | 0.09 | 3.71 | 0.18 |
| Alizarin Red S, 0.02 M | 0.00 | 0.00 | 0.00 | 0.00 | 0.00 | 0.00 |
| Alizarin Red S, 3.90 mM | 32.31 | 0.79 | 30.25 | 0.24 | 1.60 | 0.18 |
| Alizarin Red S, 1.95 mM | 28.69 | 0.24 | 29.56 | 0.10 | 2.23 | 0.10 |
| Alizarin Red S, 0.98 mM | 27.94 | 0.01 | 29.22 | 0.18 | 2.63 | 0.23 |
| Bromophenol Blue, 1.00 mM | 27.81 | 0.25 | 28.10 | 0.02 | 4.52 | 0.04 |
| Chlorophenol Red, 4.68 mM | 0.00 | 0.00 | 34.17 | 4.68 | 0.62 | 0.81 |
| Erioglaucine, 3.28 mM | 0.00 | 0.00 | 26.98 | 24.10 | 19.34 | 16.45 |
| Alcian Blue 8GX, 0.23 mM | 27.83 | 0.33 | 28.79 | 0.05 | 3.23 | 0.07 |
| Brilliant Blue G, 0.56 mM | 0.00 | 0.00 | 0.00 | 0.00 | 0.00 | 0.00 |
| Coomassie Brilliant Blue R, 0.56 mM | 17.76 | 25.11 | 28.92 | 0.05 | 3.04 | 0.08 |
| Indigo Carmine, 0.73 mM | 27.82 | 0.07 | 28.05 | 0.03 | 4.60 | 0.06 |
| Methylene Blue, 0.96 mM | 12.91 | 18.26 | 27.45 | 0.11 | 6.17 | 0.33 |
| Reactive Blue 4, 0.31 mM | 0.00 | 0.00 | 38.17 | 0.53 | 0.04 | 0.01 |
| Rhodamine B, 0.59 mM | 0.00 | 0.00 | 0.00 | 0.00 | 0.00 | 0.00 |
| Rhodamine 6G, 0.71 mM | 0.00 | 0.00 | 0.00 | 0.00 | 0.00 | 0.00 |
| Dyed papers addition | | | | | | |
| Positive control | 24.70 | 0.16 | 28.35 | 0.18 | 1.88 | 0.18 |
| Alizarin Red S, 0.02 M | 2.72 | 5.43 | 13.26 | 15.73 | 13.23 | 26.14 |
| Alizarin Red S, 3.90 mM | 0.00 | 0.00 | 30.04 | 0.11 | 0.76 | 0.04 |
| Alizarin Red S, 1.95 mM | 26.44 | 0.72 | 30.23 | 0.63 | 0.71 | 0.23 |
| Alizarin Red S, 0.98 mM | 26.81 | 0.28 | 30.88 | 0.63 | 0.51 | 0.16 |
| Bromophenol Blue, 1.00 mM | 26.07 | 0.13 | 29.22 | 0.66 | 1.22 | 0.42 |
| Chlorophenol Red, 4.68 mM | 0.00 | 0.00 | 30.10 | 1.26 | 0.82 | 0.51 |
| Erioglaucine, 3.28 mM | 9.50 | 13.44 | 0.00 | 0.00 | 0.00 | 0.00 |
| Alcian Blue 8GX, 0.23 mM | 25.22 | 1.77 | 27.67 | 2.20 | 3.67 | 3.52 |
| Brilliant Blue G, 0.56 mM | 27.44 | 2.75 | 29.21 | 1.12 | 1.30 | 0.73 |
| Coomassie Brilliant Blue R, 0.56 mM | 14.58 | 20.62 | 14.71 | 20.80 | 0.53 | 0.75 |
| Indigo Carmine, 0.73 mM | 11.94 | 16.88 | 26.90 | 1.68 | 4.87 | 3.85 |
| Methylene Blue, 0.96 mM | 26.59 | 5.26 | 27.18 | 5.95 | 16.47 | 22.77 |
| Reactive Blue 4, 0.31 mM | 6.00 | 8.49 | 28.91 | 3.91 | 3.19 | 4.06 |
| Rhodamine B, 0.59 mM | 0.00 | 0.00 | 31.12 | 0.40 | 0.44 | 0.09 |
| Rhodamine 6G, 0.71 mM | 0.00 | 0.00 | 0.00 | 0.00 | 0.00 | 0.00 |

These results suggest that: —Alizarin Red S does show qPCR inhibition at high concentrations (0.02 M) but that as the concentration reduces so does the amount of inhibition. Bromophenol Blue, Alcian Blue 8GX, Methylene Blue and Indigo Carmine do not show any obvious signs of inhibition at the concentrations tested. The dyes Chlorophenol Red, Erioglaucine and Reactive Blue 4 may cause some possible inhibition or interference to the qPCR reaction. Brilliant Blue G appears to interfere with the qPCR reaction when applied as a liquid but no inhibition is observed when a dyed paper punch is used. Coomassie Brilliant Blue results indicate that this dye at the concentration range used may cause minor interference and presumably reducing the concentration of both dyes will remove the observed interference/inhibition. The fluorescence derived from the dyes Rhodamine B and Rhodamine 6G clearly interfered/inhibit with the qPCR detection and reaction.

Although these tests suggest that some of the dyes are inhibitory towards qPCR this does not necessarily mean that they cannot be used as indicating dyes for either chemically-coated or un-coated papers. During standard processing of sample collection punches a wash step is routinely used and this is designed to remove inhibitory chemicals and contaminants from the solid paper support. This washing will also remove any water soluble indicating dyes.

Multiplex PCR—this was investigated by short tandem repeat (STR) multiplex PCR reactions using the AmpFL STR® Identifiler® PCR Amplification Kit (ABI). Punches (1.2 mm) were taken from controls and dyed papers and placed in reaction wells. Reactions were performed in triplicate. STR PCR was performed using a GeneAmp® PCR System 9700 as per user manufacturer's instructions (26-cycle PCR). The resultant amplicons were separated by capillary electrophoresis using a 3130xl Genetic Analyzer (ABI) and analysed with GeneMapper™ v3.2 software.

Short tandem repeat (STR) reactions indicated that several dyed papers when added directly to the multiplex PCR reactions demonstrated no interference and/or inhibitory effects. All of the profiles generated showed concordance with the controls in terms of allele designation as described in the associated electrophoretograms (EPGs; see FIGS. 1a-d for representative images).

The presence of the dyes; Bromophenol Blue (3), Chlorophenol Red (7), Brilliant Blue G (28), Coomassie Brilliant Blue R (31), Indigo carmine (34) and Reactive Blue 4 (46) were all associated with full STR profiles of comparable quality to the controls and therefore do not show any obvious PCR inhibition when used in multiplex PCR reactions. Methylene Blue (36), Erioglaucine (20), Alcian Blue 8GX (27) Rhodamine B (47) and Rhodamine 6G (48) also gave full profiles but displayed a small amount of interference as illustrated by a minor tail-off of the high molecular weight products. Reducing the concentration of the individual dyes still further will probably reduce the observed interference.

Alizarin Red S (1) when present at the higher concentration of 0.02 M exhibited PCR inhibition. The resultant STR profiles were considered to be partial with reduction in the yield of the higher molecular weight PCR products. However, at lower concentrations of Alizarin Red S i.e. 3.90, 1.95 and 0.98 mM EPG results were comparable to the controls.

Using Alizarin Red S as a dye did generate one minor issue as visualised by the presence of additional dye artefacts in the sample profiles. These artefacts were shown to be derived from the dye itself. Three dye artefacts were visible: i) 249 bp in Blue spectrum; ii) 327 bp in Blue spectrum and iii) 359 bp in Green spectrum. The first two are not within the Identifiler™ allelic ladder bin set and when present above the 50 rfu threshold setting were called as off-ladder peaks but the 3rd does fall within the D2S1338 loci. The first two dye artefacts are easily identifiable as such due to their broad nature and therefore should not prove problematic during forensic human identification data analysis, however the 3rd could potentially hide a real sample peak at allele D2S1338.

To address this it was shown that the size of the dye artefact decreased significantly as the dye concentration was reduced. At a concentration of 0.98 mM the height of all Alizarin Red S artefacts were reduced to below 10 rfu (see FIG. 1a-d). These levels are below those that are required for uploading DNA profiles to National DNA databases. Therefore at lower concentration the Alizarin Red S artefacts do not represent a significant challenge during human identification analyses.

During standard forensic human identification workflows paper punches are routinely washed and therefore any interference or inhibitory effects derived from the presence of the dyes will be minimised. This was confirmed during additional experiments using Alizarin Red S. The dye artefacts were not observed suggesting that the dye had been washed out during the sample preparation steps (data not shown). Therefore it was concluded that providing the concentration of the candidate dye is sufficiently low, they will have a negligible effect on multiplex PCR reactions.

Example 8: STR Analysis of Biological Samples

HeLa cells applied to dyed cellulose-papers were used to test the compatibility of the candidate dyes with short tandem repeat (STR) analysis. Dyes were applied to both chemically-coated and un-coated papers.

Sample preparation—Selected dyes were dissolved in 0.1 M Tris HCl pH 8.0 as described above. These were applied to 4×6 cm pieces of chemically-coated cellulose paper and allowed to dry overnight on the bench. Hela cells (40 µl) in TE buffer, pH 7.8 (concentration ~2.5×105 cells per ml) were pipetted onto a sterile foam applicator and applied to the dyed paper sample using mild pressure for ca. 10 s. This was repeated for all of the dyed paper samples. Indicating FTA™ micro cards were used as controls. STR PCR reactions were set-up using AmpFL STR® Identifiler® PCR Amplification Kit (ABI) as per user manufacturer's instructions. Punches (1.2 mm) were taken from controls and chemically coated dyed papers and subjected to STR profiling. Two replicates were performed for each of the samples including two positive controls on Indicating FTA™ micro-cards. PCR was performed using GeneAmp® PCR System 9700 as per user manufacturer's instructions (28-cycle PCR). PCR products were separated by CE using 3130xl Genetic Analyzer (ABI) and analysed using GeneMapper™ v3.2 software.

Figure 2:
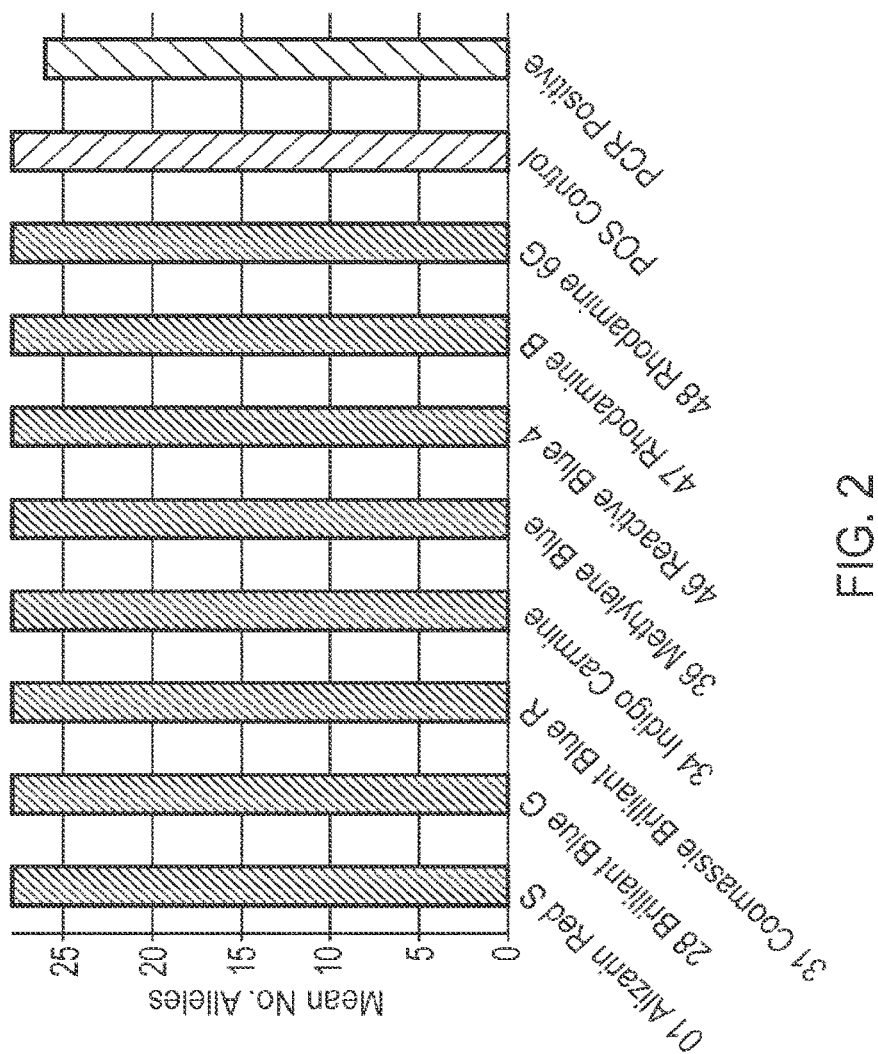
FIG. 2 shows data obtained for tested samples compared with controls demonstrating that comparable concordant allelic designation was produced.

All the tested samples produced concordant allelic designation that was comparable to control samples (see FIG. 2; data not shown for Erioglacine, Chlorophenol red and Bromophenol blue). All of the dyed samples generated full profiles with comparable peak height and peak balance to the controls. Some variability in the data was observed and this was attributed to the known heterogeneous challenge of applying biological samples to solid support materials (see Oostdik et al. 2013 Forensic Sci Int Genet; 7(1): 129-135). Similar variability was observed from samples applied to the controls.

Figure 3:
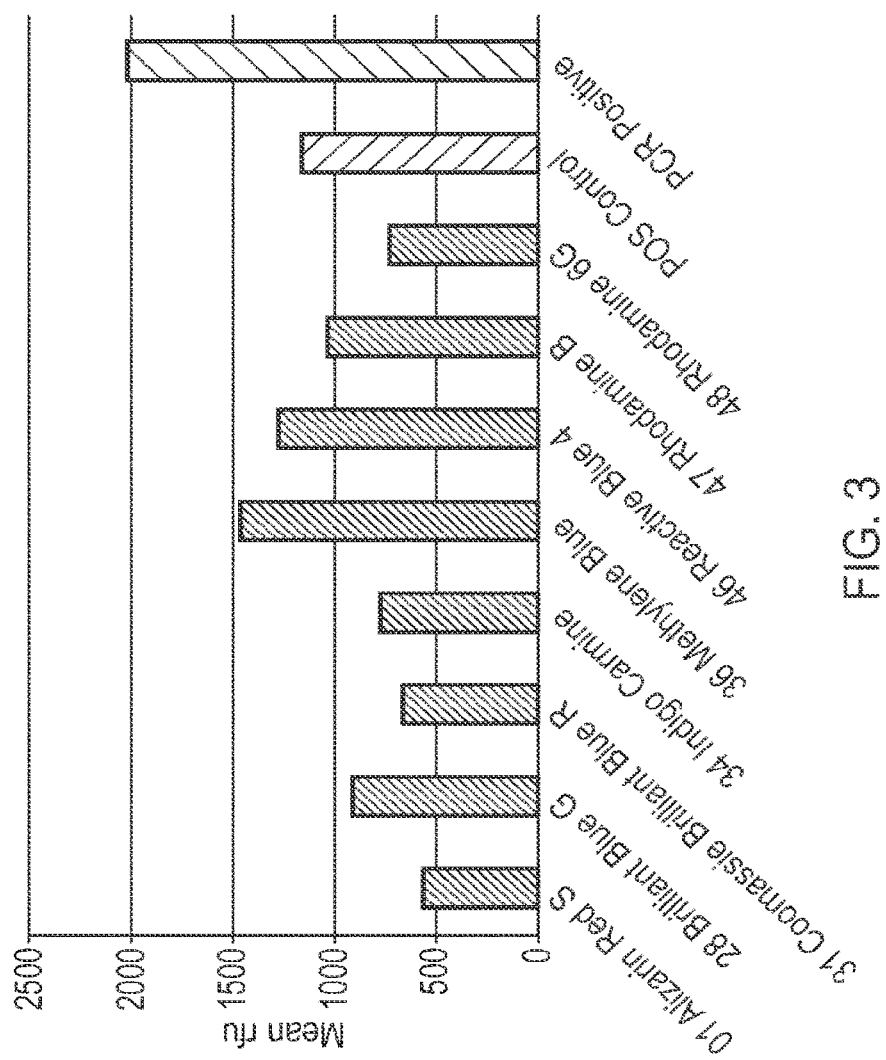
FIG. 3 shows data obtained for STR analysis of HeLa cells applied to solid supports coated with different indicator dyes. Mean Profile Peak Height (rfu).
Figure 4:
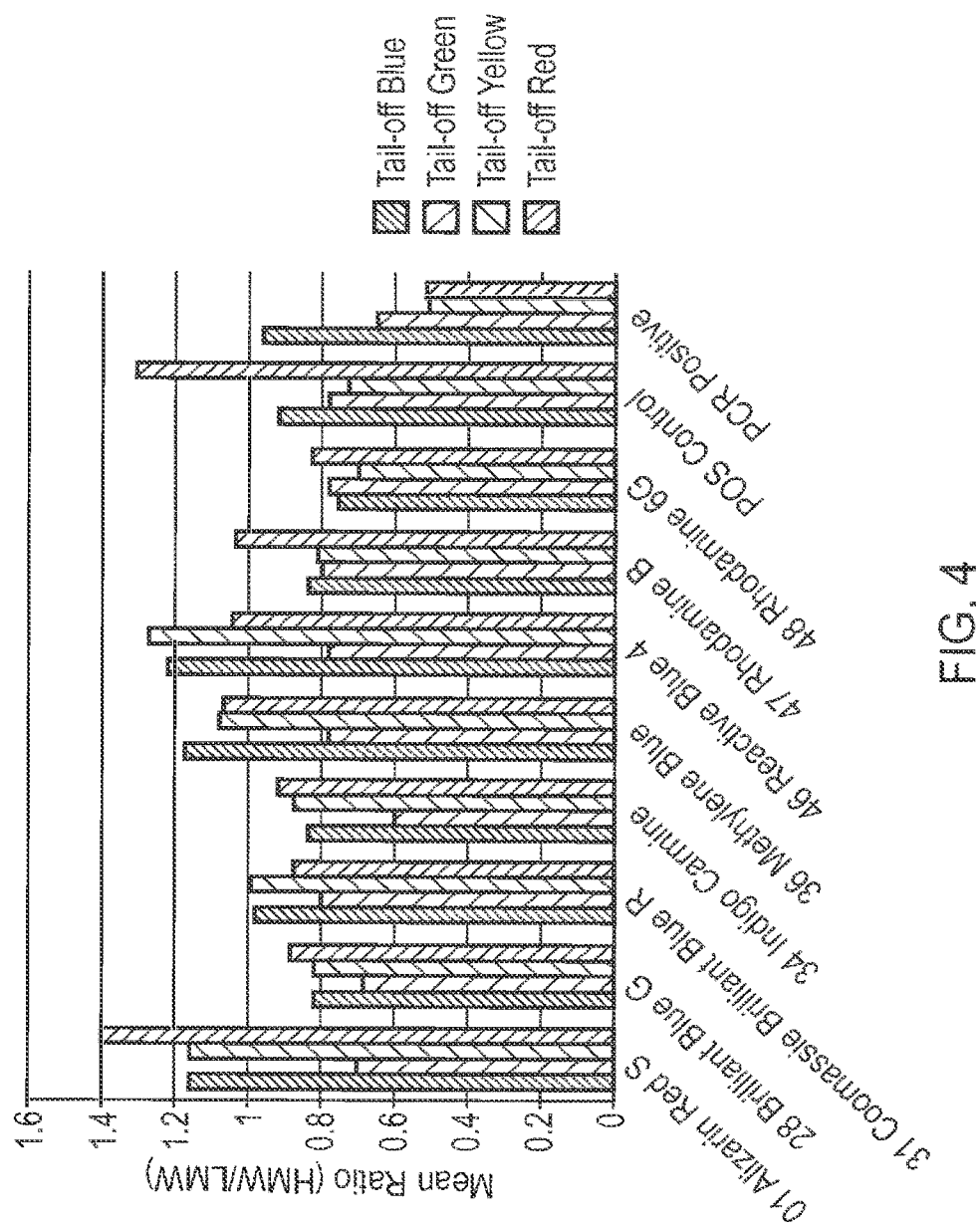
FIG. 4 shows data obtained for STR analysis of HeLa cells applied to solid supports coated with different indicator dyes. The figure shows the mean tail off rate associated with STR PCR products of defined molecular weight.

The composite mean peak heights derived from all the solid support were in excess of that require for uploading STR profiles to National DNA databases, indicating that the presence of the dyes on the solid support had negligible interference or inhibitory effects (see FIG. 3; data not shown for Erioglacine, chlorophenol red and Bromophenol blue). The amplification efficiency of the multiplex STR PCR is demonstrated by the minimal amount of PCR product tail off. STR profiles derived from dyed samples generate comparable peak heights and comparable tail off rates compared to controls (see FIG. 4; data not shown for Erioglacine, chlorophenol red and Bromophenol blue).

These data indicates that the presence of the dyes applied to the solid supports do not significantly affect the quality of the resultant STR profiles.

The invention claimed is:

1. A method for collecting a biological sample comprising, applying a biological sample to a solid support, wherein said sample support comprises:

a dye selected from the group consisting of Alizarin Red, Methylene blue, Reactive blue 4, Alcian blue, and Indigo carmine;
Tris HCl;
Tris EDTA;
SDS; and
uric acid;
wherein when the dye is Alizarin Red, the Alizarin Red is used at a concentration of about 0.3 to about 3.9 mM,
wherein when the dye is Methylene blue, the Methylene blue is used at a concentration of about 0.3 to about 4.0 mM,
wherein when the dye is Reactive blue 4, the Reactive blue 4 is used at a concentration of about 0.31 to about 3.14 mM,
wherein when the dye is Alcian blue, the Alcian blue is used at a concentration of about 0.1 to about 5 mM,
wherein when the dye is Indigo carmine, the Indigo carmine is used at a concentration of about 0.2 to about 7.5 mM,
wherein the solid support is configured to collect a biological sample,
wherein the solid support comprises a cellulose-based paper that is coated or impregnated with the Tris HCl, the Tris EDTA, the SDS, and the uric acid, and
wherein the dye is resistant to one or more of colour changes or colour fading, when exposed to one or more of ethylene oxide or ultra violet radiation.

2. The method of claim 1, wherein said solid support is chemically impregnated with said dye.

3. The solid support as defined in claim 1, wherein the dye is a first dye, and wherein said solid support further comprises a second dye selected from the group.

4. The method of claim 3, wherein the first dye and the second dye are selected from Alizarin Red and Alcian blue; or Alizarin Red and Indigo Carmine; or Alcian blue and Indigo Carmine.

5. The method of claim 1, wherein said solid support further comprises a chaotrope.

6. The method of claim 5, wherein said chaotrope is a guanidinium salt.

7. The method of claim 1, wherein said biological sample comprises a nucleic acid.

* * * * *